July 22, 1969
R. J. CLARK
3,456,688
VALVE HAVING CUSHIONING MEANS
Filed Oct. 16, 1967
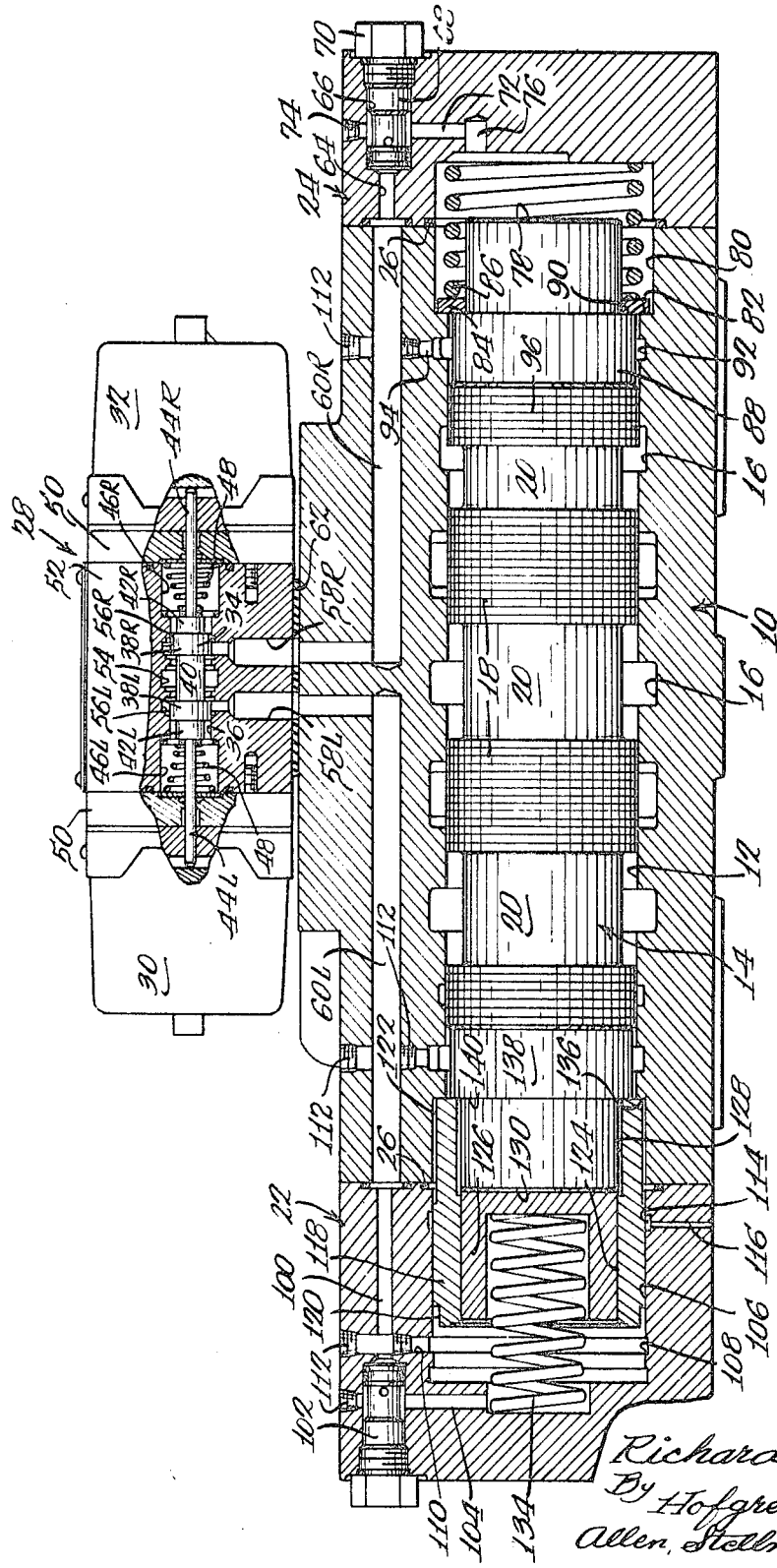
Inventor:
Richard J. Clark
By Hofgren, Wegner,
Allen, Stellman & McCord
Atty's

United States Patent Office 3,456,688
Patented July 22, 1969

3,456,688
VALVE HAVING CUSHIONING MEANS
Richard J. Clark, Racine, Wis., assignor to Racine Hydraulics, Inc., a corporation of Wisconsin
Filed Oct. 16, 1967, Ser. No. 675,423
Int. Cl. F16k 11/07, 31/12
U.S. Cl. 137—625.63                11 Claims

ABSTRACT OF THE DISCLOSURE

A hydraulically centered and cushioned spool valve including a casing having a spool movable within a bore in the casing, a control means for alternately directing fluid under pressure to either end of the spool while connecting the opposite end of the spool to an exhaust or for directing fluid under pressure to both ends of the spool, a first means operative upon movement of the spool in one direction for trapping a column of fluid adjacent one end of the spool, a second means operative after movement of the spool in the other direction for trapping a column of fluid adjacent the other end of the spool, and a third means for trapping a column of fluid when the spool is moved to a center position within the bore.

SUMMARY OF THE INVENTION

The principal object of the invention is to provide a new and improved spool valve.

More specifically, it is an object of the invention to provide a spool valve having a new and improved hydraulic centering and cushioning arrangement.

Another object is the provision of a spool valve comprising a casing having a bore, a spool reciprocally received within the bore, a control means for directing fluid under pressure to one end of the spool while connecting the other into an exhaust or vice versa, or for directing fluid under pressure to both ends of the spool, together with various means for trapping columns of fluid to provide cushioning effect when the spool moves from a center position to one end position or from a center position to the other end position, or when the spool moves from one of said end position to the center position.

Yet another object is the provision of a valve such as that set forth in the preceding paragraph further including port means, each in fluid communication with the respective end of the bore together with a pair of ports, each near, but not at, respective ends of the bore in fluid communication with the bore and the corresponding one of the port means and closable after a predetermined amount of movement of the spool, a check valve in each of the port means between the respective end of the bore and the associated port arranged to preclude fluid from passing from the bore into the associated port means except by the associated port whereby fluid may be trapped in either end of the bore to provide for cushioning of the spool at the ends of its stroke.

A still further object is the provision of a valve such as that set forth above wherein the means for cushioning movement of the spool when the spool is moving to a center position includes a shoulder on the spool and a shoulder within the bore, a sleeve surrounding a portion of the spool and adapted to abut both the shoulder on the spool and the shoulder in the bore, the sleeve having a portion of reduced diameter less than the diameter of the bore and movable to close off a port therein as the spool approcahes a center position within the bore.

Other objects and advantages of the invention will become apparent from the following specification taken in conjunction with the accompanying drawing.

DESCRIPTION OF THE DRAWING

The figure illustrates an exemplary embodiment of a hydraulically centered spool valve with cushion means made according to the invention.

DETAILED DESCRIPTION

The exemplary embodiment of a spool valve made according to the invention contemplates the provision of a means for hydraulically centering a spool to a center position, means for cushioning the spool as it moves to an operative position either to the left or to the right of the center position and a means for cushioning the movement of the spool as it is moved to the center position from at least one of the positions to the side thereof.

As seen in the figure, a spool valve made according to the invention includes a casing, generally designated 10, including a central bore 12 in which a spool valve member, generally designated 14, is mounted for reciprocal movement. The bore 12 includes a plurality of grooves 16 which may be located in any desired manner to cooperate with lands 18 and grooves 20 on the spool valve member 14 to provide any desired valving function. A "4-way" valve arrangement is illustrated.

To complete the housing for the spool valve member 14, the ends of the casing 10 are provided with end caps, generally designated 22 and 24. The end caps 22 and 24 may be secured to the casing 10 by any suitable means, as by cap screws (not shown). Of course, suitable sealing means 26 are interposed between the abutting interfaces of the end caps 22 and 24 and the casing 10.

In order to control the position of the spool valve member 14 within the bore 12, a pilot valve, generally desigoniated 28, is mounted on the casing 10 and includes a first solenoid 30 and a second solenoid 32 arranged to shift a pilot spool valve member 34 within a bore 36. The pilot spool valve member 34 includes two lands 38L and 38R separated by a central groove 40. Further included are a pair of reduced end portions 42L and 42R at the ends of the pilot spool valve member 34. The ends of the pilot spool valve member 34 are further arranged to confront actuating rods 44L and 44R associated with the solenoids 30 and 32, respectively.

The bore 36 is provided with a pair of oppositely disposed grooves 46L and 46R which house springs 48 interposed between end plate 50 to bias the pilot spool valve member 34 to a central position as will become apparent hereinafter. The end plates 50 also mount respective ones of the solenoids 30 and 32. Suitable sealing means are provided as known in the art.

The bore 36 is formed in a pilot casing 52 and further includes a central groove 54 which is adapted to communicate with a source of hydraulic fluid under pressure. Located at either side of the central groove 54 are port grooves 56L and 56R which communicate with ports 58L and 58R formed as bores within the pilot casing 62.

As mentioned previously, the grooves 46L and 46R are adapted to communicate with the tank of a hydraulic system and thus, when the pilot spool valve member 34 is shifted to the left as viewed in the figure in response to actuation of one of the solenoids, fluid communication will be estabished between the central groove 54 and the port 58L while fluid communication will be established between the port 58R and the groove 48R. As a result, fluid under pressure will be provided to the port 58L while fluid in the port 58R may be drained to the tank.

On the other hand, when the pilot spool valve member 34 is shifted to the right as viewed in the figure, fluid communication will be established between the central groove 54 and the port 58R thereby providing fluid under pressure in the latter while fluid communication will be established between the port 58L and the groove 46L thereby allowing fluid in the former to pass to the tank.

When neither of the solenoids 30 and 32 are energized, the pilot spool valve member 34 will be located in the position shown and as a result, fluid under pressure directed through the central groove 54 will be permitted to pass into both of the port grooves 56L and 56R so that fluid under pressure wil be provided to both the ports 58L and 58R.

The casing 10 includes a pair of bores 60L and 60R which are in fluid communication with the ports 58L and 58R of the pilot valve 28. Sealing means 62 are interposed between the pilot casing 52 and the casing 10 to prevent leakage from the ports 58L, 58R, 60L and 60R at the interface between the two casings.

The bore 60R in turn communicates with a bore 64 and the end cap 24 which, in turn, terminates at its right-hand end in an enlarged bore 66. Within the enlarged bore 66 there is disposed a conventional check valve 68 and the bore 66 is plugged by a plug 70. The check valve 68, in turn, communicates with the bore 72 having its upper end plugged by a plug 74 and the arrangement is such that fluid under pressure directed to the bore 60R by the pilot spool valve 28 will pass through the check vave 68 to the bore 72 but fluid within the bore 72 cannot pass through the check valve 68 to the bore 60R.

A bore 76 communicating with the bore 72 in turn directs fluid pressure against an end 78 of the spool valve member 14. The end 78 is generally disposed in an enlarged bore section 80 formed in part in the casing 10 and in the end cap 24 with the diameter of the end 78 being significantly smaller than the diameter of the bore 80. The bore 80 is also of greater diameter than the bore 12 so that an abutment 82 is formed. A washer 84 having an outer diameter approximately equal to the diameter of the bore 80 and an inner diameter somewhat less than the diameter of the bore 12 is located against the abutment 82 and a spring 86 is interposed between the washer 84 and the end of the bore 80 within the end cap 24.

The spool valve member 14, adjacent its right-hand end 78, includes a reduced section 88 which is just slightly less in diameter than the diameter of the bore 12 and greater in diameter than the diameter of the end 78. Thus, an abutment 90 is formed on the spool valve member 14 and which may engage the washer 84.

The bore 12 is additionally provided with a groove 92 that communicates with a port 94 with the bore 60R. Because of the reduced diameter of the section 88, it will be apparent that at least for many positions of the spool valve member 14 within the bore 12, free fluid communication will exist between the port 94 and the bore 80. However, when the spool valve member 14 is shifted sufficiently to the right, a land 96 adjacent the reduced section 88 is moved to cut off communication between the bore 80 and the port 94.

The bore 60L communicates with a bore 100 in the end cap 22 which, in turn, communicates through a check valve 102 with a port 104. The disposition of the check valve within the end cap 22 is identical to the manner in which the check valve 68 is disposed within the end cap 24 and need not be described further. It is to be noted, however, that the check valve 102 is arranged to permit fluid under pressure to flow from the bore 100 to the bore 104 but not the reverse.

The bore 104 communicates with an enlarged bore 106 located in part in the end cap 22 and in part in the casing 10. A groove 108 in the bore 106 communicates through a port 110 with the bore 100. The upper end of the bore 110 is plugged by means of a plug 112. Similar plugs 112 seal other nonoperational ends of bores in the casing 10. A second groove 114 is also provided in the bore 106 and communicates through a port 116 with the tank of a hydraulic system.

Disposed within the bore 106 is a sleeve 118 which, as seen in the figure, includes a left-hand end portion 120 of reduced diameter and a right-hand end portion 122, also of reduced diameter.

The sleeve 118 further includes an internal surface 124 which is slidably engaged with a piston 126. A second internal surface 128 within the sleeve 118 has a diameter slightly larger than the diameter of the surface 124 and is adapted to overlie the left end 130 of the spool valve member 14 and to be spaced slightly therefrom to premit the passage of fluid therebetween.

The piston 126 is, as mentioned previously, slidably received within the sleeve 118 and may abut against the end 130 of the spool valve member 14. Additionally, a spring 134 is interposed between the piston 126 and the leftmost end of the bore 108 to bias the piston 126 toward the spool valve member 14.

The bore 106 in which the sleeve 118 is received is of slightly greater diameter than the bore 12 in the casing so at their meeting points, an abutment 136 is formed. The inner diameter of the surface 128 of the sleeve 118 is of lesser diameter than the diameter of the bore 12, and adjacent the end 130 of the spool valve member 14, there is provided a reduced end 138 which has a diameter less than that of the bore 12 but greater than that of the end 130. As a result, the right end of the sleeve 118 may encounter an abutment 140 on the spool valve member 14.

In the exemplary embodiment of the invention, the spring 86 is constructed and arranged in its environment such that the force applied thereby to the washer 84 is about twice the force applied by the spring 134 to the piston 126 so that in the event of hydraulic failure, the spool member 14 will be moved to the center position. Also the area on the right-hand end of the spool valve member 14 subjected to hydraulic pressure (effective area) is defined by the area of the end 78, the area of the abutment 90 and the area of the interface between the reduced section 88, and the land 96 is such as to be less than the combined effective area of the sleeve 118 and the piston 126. Additionally, the effective area of the piston 126 alone is arranged to be less than the right-hand end of the spool valve member 14. More specifically, the arrangement is such that the combined effective area of the sleeve 118 and the piston 126 less the effective area of the right-hand area of the spool valve member 14 is approximately equal to the effective area of the right-hand area of the spool valve member 14 less the effective area of the piston 126 alone.

From the foregoing description of the structure of the exemplary embodiment, it will be apparent that when the spool valve member 14 is in the position shown, the sleeve 118 will be at its rightmost position engaging the abutment 136. As a result, any fluid pressure applied to the sleeve 118 will not be transmitted to the spool valve member 14 but rather, merely to the casing 10. However, for all positions of the sleeve 118 to the left of that illustrated, the effective surface responsive to fluid under pressure for moving the spool valve member 14 to the right will be that of the sleeve 118 and the piston 126.

The mode of operation of the valve is as follows. If pilot valve spool member 34 is shifted to the left as viewed in the figure by action of the solenoids, fluid under pressure from the central groove 54 will be applied to the conduit including the port 58L, the bore 60L, the bore 100, the check valve 102, the bore 104 and against the piston 126. At this time, a path of the fluid communication including the groove 92, the bore 94, the bore 60R, the port 58R and the groove 46R will be established to the tank. As a result, the spool valve member 14 will be shifted to the right as viewed in the figure. At some point in such rightward movement, the land 96 will completely cover the groove 92 thereby breaking the aforementioned path of fluid communication to the tank and since the check valve 68 will not pass fluid from the bore 72 to the bore 64, a column of fluid is trapped in the bore 80 thereby resisting further rightward movement of the spool valve member 14 to provide a cushioning action for the movement of the latter.

If, on the other hand, the pilot spool valve member 34 were shifted to the right as viewed in the figure by action of the solenoids, fluid under pressure would be directed to the right-hand end of the spool valve member 14 thereby shifting the latter to the left as viewed in the figure. At some point in such leftward movement, a portion of the outer surface of the sleeve 118 would be moved to completely cover the groove 108 and since the check valve 102 will not permit fluid to flow from the bore 104 to the bore 100, the path to the tank including the groove 108 and the bore 110 would be closed thereby trapping a column of fluid within the bore 106 between the sleeve 118 and the piston 126. As a result, the trapped column of fluid will resist further leftward movement of the spool valve member 14 to provide a cushioning action similar to that mentioned above.

If the spool valve member 14 is initially in its leftmost position, having been moved there in the manner set forth in the preceding paragraph, and it is desired to center the spool valve member 14, the de-energization of both of the solenoids 30 and 32 would permit the springs 48 to center the pilot spool valve member 34 which will then occupy the position shown in the figure. As a result, fluid under pressure is directed to both the right-hand end of the spool valve member 14 and to the sleeve 118 and the piston 126. Since, as mentioned above, the effective area of the sleeve 118 and the piston 126 is greater than the effective area of the right-hand end of the spool valve member 14, the spool valve member 14 will be moved to the right as viewed in the figure due to the transmission of force thereto by both the sleeve 118 and the piston 126. During a portion of such movement, hydraulic fluid in the bore 106 between spool valve member 14 and the sleeve 118 will pass through the reduced diameter portion 122 of the sleeve 118 to the groove 114 to be directed through the bore 116 to the tank. However, at a point in the movement of the sleeve 118, the portion of the latter having the maximum diameter will move over and completely close the groove 114 thereby trapping a column of fluid within the bore 106 between the sleeve 118 and the spool valve member 14. Such a trapped column of fluid will tend to resist further rightward movement of the sleeve 118 and therefore the spool valve member 14 will provide a cushioning action as the latter is moved towards its center position. Shortly after the column of fluid is trapped, the sleeve 118 will confront the abutment 136 so that any force applied to the sleeve 116 will not be transmitted to the spool valve member 14 to cause movement of the latter. Accordingly, the effective area tending to move the spool valve member 14 to the right is reduced by an amount equal to the effective area of the sleeve 118 alone and since the effective area of the piston 126 alone is less than the effective area of the right-hand area of the spool valve member 14, the application of pressure to that end will tend to move the spool valve member 14 to the left. However, before substantial leftward movement of the spool valve member 14 can take place, the fact that the abutment 140 thereon will engage the sleeve 118 to tend to move the later away from the abutment 136, will cause the effective area operative to move the spool valve member 14 to the right to again be increased to exceed the effective area at the right-hand end of the spool valve member 14 to preclude such leftward movement of the latter.

If the spool valve member 14 is in a rightmost position and it is desired to center the same, it will be appreciated that the sleeve 118 will not be abutting the abutment 140 on the spool valve member 14, but rather, be disengaged therefrom and in contact with the abutment 136 on the casing 10. As a result, the effective area at the right-hand end of the spool valve member 14 will be greater than the effective area at the left-hand end of the spool valve member 14 so that the spool valve member 14 will be moved to the left. When the spool valve member 14 reaches the centermost position, the abutment 140 thereon will engage the sleeve 118 and further leftward movement will be precluded in the manner set forth in the preceding paragraph.

I claim:

1. A hydraulically centered and cushioned spool valve comprising: a casing having a bore with opposite ends; a spool having opposed ends and mounted for reciprocation in said bore; control means in fluid communication with said casing for alternately
   (a) directing fluid under pressure to either end of said spool while connecting the opposite end of the spool to an outlet to move the spool in either of two directions, and
   (b) directing fluid under pressure to both ends of said spool;
first cushioning means in said casing operative after a predetermined movement of said spool within said bore in one direction toward one end of the bore for trapping a column of fluid adjacent one end of said spool; second cushioning means in said casing operative after a predetermined movement of said spool within said bore toward the opposite end of the bore and in a direction opposite said one direction for trapping a column of fluid adjacent the other end of said spool; means operative in response to the application of fluid under pressure to both ends of said spool for moving said spool toward a center position within said bore; and third cushioning means in said casing operative when said spool approaches said center position for trapping a column of fluid to cushion movement of said spool.

2. A valve according to claim 1 wherein one of said first, second and third cushioning means comprises a land on said spool, and a port communicating with said bore closable by said land and connectable to tank by said control means.

3. A valve according to claim 1 wherein one of said first, second and third cushioning means comprises a sleeve movable with said spool within said bore, and a port communicating with said bore closable by said sleeve and connectable to tank by said control means.

4. A valve according to claim 1 including a pair of port means, each in fluid communication with a respective end of said bore, and alternatively connectable to a source of fluid under pressure and an outlet by said control means; said first and second cushioning means each including a port near, but not at, respective ends of the bore and communicating between said bore and the corresponding one of said port means and closable after a predetermined movement of said spool, and a check valve in each of said port means between the respective end of said bore and the associated port arranged to preclude fluid from passing from said bore into the associated port means except via the associated port whereby when the port is closed a trapped column of fluid will exist in the associated end of the bore.

5. The valve of claim 4 wherein one of said first and second cushioning means further includes a land on said spool for closing one of said ports.

6. The valve of claim 4 wherein one of said first and second cushioning means further includes a sleeve movable with said spool for closing one of said ports.

7. The valve of claim 6 wherein one end of said bore includes a portion of enlarged diameter with said sleeve being located therein; said spool includes a portion of reduced diameter within said sleeve; a piston abutting said spool and within said sleeve, and means for biasing said piston toward said spool.

8. The valve of claim 7 wherein said sleeve is movable to abut a shoulder on said spool and a shoulder in said bore which includes a portion of lesser diameter than said enlarged diameter; said third cushioning means including a port in said enlarged diameter portion closable by said sleeve as said sleeve moves toward the shoulder in said bore.

9. The valve of claim 8 wherein said sleeve includes an area adapted to be subjected to fluid under pressure and is adapted to transmit pressure applied at said area as a force to said spool at said spool shoulder, said bore shoulder being operative to limit movement of said sleeve thereby precluding force transmission after said spool has moved past said center position in one direction but allowing force transmission when said spool moves past said center position in the opposite direction whereby when fluid under pressure is applied to both ends of said spool, said spool will occupy said center position with force being transmitted by said sleeve if said spool moves from said center position in said opposite direction to maintain said spool in said center position.

10. The valve of claim 6 wherein said sleeve includes an area adapted to be subjected to fluid under pressure and is adapted to transmit pressure applied at said area as a force to said spool to move the same, said third cushioning means being effective to cushion movement of said sleeve as said spool approaches said center position and preclude further transmission of force by said sleeve to said spool.

11. A hydraulically centered spool valve comprising: a casing having a bore with opposite ends; a spool having opposite ends and mounted for reciprocation within said bore, one of said spool ends being of reduced diameter and defining a shoulder on said spool; a pair of port means in fluid communication with respective ones of said bore ends and alternatively connectible to a source of fluid under pressure and an outlet; a pair of ports near, but not at, respective ends of said bore and communicating between said bore ends and the corresponding one of said port means; a pair of check valves, one for each port means, located between the associated bore end and the associated port and arranged to preclude fluid from passing from said bore into the associated port means except via the associated port whereby when the associated port is closed, a trapped column of fluid will exist in the associated end of the bore; a sleeve received about said one spool end and within said bore adjacent one end thereof, said bore additionally having a portion of enlarged diameter and defining a shoulder therein for restricting movement of said sleeve; said sleeve being movable with said spool in one direction of movement thereof to close one of said ports to thereby trap a column of fluid and cushion movement of said spool in said one direction; a land on said spool for closing the other of said ports whereby when said spool moves in a direction opposite of said one direction, said land will close said other port thereby trapping a column of said fluid to cushion movement of said spool in said opposite direction; an additional port communicating with said enlarged portion of said bore connectable to an outlet, said additional port being closable by said sleeve as said sleeve moves towards said bore shoulder to trap a column of said fluid to cushion sleeve movement towards said bore shoulder, and a piston within said sleeve abutting said one spool end, said piston being adapted to move said spool in said one direction when movement of said sleeve is restricted by said bore shoulder when the port means associated with said one bore end is connected to a source of fluid under pressure and the other of the port means is connected to an outlet.

References Cited

UNITED STATES PATENTS

| 2,725,077 | 11/1955 | Nicholl | 137—625.64 |
| 2,732,860 | 1/1956 | Ray | 137—625.64 |
| 3,189,050 | 6/1965 | Heckman | 137—625.63 |
| 3,269,416 | 8/1966 | Adams | 137—625.63 |

HENRY T. KLINKSIEK, Primary Examiner

U.S. Cl. X.R.

137—625.66; 251—50